(12) United States Patent
Ozlem Keles et al.

(10) Patent No.: US 10,842,596 B2
(45) Date of Patent: Nov. 24, 2020

(54) ORTHODONTIC PALATAL AND JAW EXPANSION DEVICE THAT CAN BE EASILY ATTACHED TO/DETACHED FROM INSIDE THE MOUTH

(71) Applicants: Ahmet Ozlem Keles, Istanbul (TR); Ahmet Eren Keles, Istanbul (TR)

(72) Inventors: Ahmet Ozlem Keles, Istanbul (TR); Ahmet Eren Keles, Istanbul (TR)

(73) Assignee: AHMET OZLEM KELES, Istanbul (TR)

( * ) Notice: Subject to any disclaimer, the term of this patent is extended or adjusted under 35 U.S.C. 154(b) by 0 days.

(21) Appl. No.: 16/095,004

(22) PCT Filed: Oct. 20, 2016

(86) PCT No.: PCT/TR2016/000143
§ 371 (c)(1),
(2) Date: Oct. 19, 2018

(87) PCT Pub. No.: WO2017/188899
PCT Pub. Date: Nov. 2, 2017

(65) Prior Publication Data
US 2019/0125495 A1 May 2, 2019

(30) Foreign Application Priority Data
Apr. 26, 2016 (TR) .................. 201605406

(51) Int. Cl.
*A61C 7/10* (2006.01)
(52) U.S. Cl.
CPC ...................... *A61C 7/10* (2013.01)

(58) Field of Classification Search
CPC ................ A61C 7/10; A61C 7/12; A61C 7/36
USPC .................... 433/2, 5, 6, 7, 18, 24
See application file for complete search history.

(56) References Cited

U.S. PATENT DOCUMENTS

| 7,780,445 | B2 | 8/2010 | Keles | |
|---|---|---|---|---|
| 2003/0207225 | A1* | 11/2003 | Huge | A61C 7/10 433/7 |
| 2007/0218416 | A1* | 9/2007 | Keles | A61C 7/10 433/7 |

(Continued)

FOREIGN PATENT DOCUMENTS

| DE | 2302953 A1 * | 8/1973 | ............... A61C 7/10 |
|---|---|---|---|
| FR | 903761 A * | 10/1945 | ............... A61C 7/10 |

(Continued)

*Primary Examiner* — Edward Moran
*Assistant Examiner* — Matthew P Saunders
(74) *Attorney, Agent, or Firm* — Duane Morris LLP; Gregory M. Lefkowitz

(57) ABSTRACT

The present invention relates to a palatal and jaw expansion device comprising at least one screw, at least two blocks that are positioned on the screw so as to move on the screw, at least one stabilization rod whereon the blocks are seated, a movement mechanism disposed at the center of the screw and an arm that has a fixed end fixed to the movement mechanism perpendicularly to the horizontal axis where the screw extends and a free end and hat, when force is applied on the free end, rotates the movement mechanism whereon the arm is fixed and the screw around the horizontal axis where the screw extends, enabling the blocks to move on the screw.

12 Claims, 4 Drawing Sheets

(56) References Cited

U.S. PATENT DOCUMENTS

Figure 1:
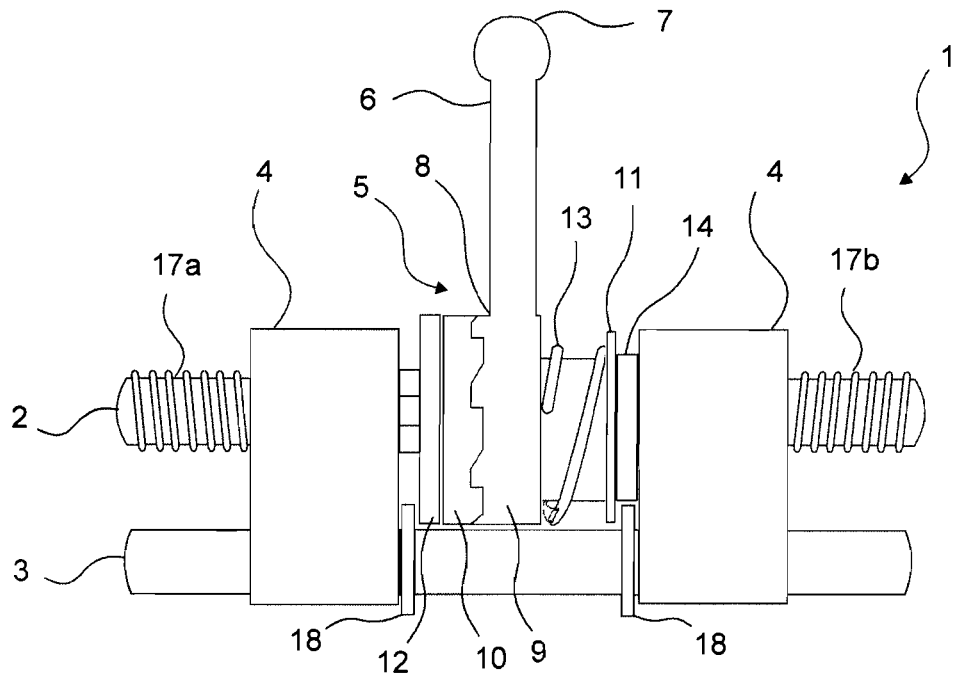

| | | | |
|---|---|---|---|
| 2009/0081602 A1* | 3/2009 | Ayan | A61B 17/663 433/7 |
| 2010/0112507 A1* | 5/2010 | Ehrenberger | A61C 7/10 433/7 |
| 2011/0207080 A1* | 8/2011 | Maadi | A61C 13/0001 433/148 |
| 2015/0056566 A1* | 2/2015 | Moon | A61C 7/10 433/7 |
| 2016/0008098 A1* | 1/2016 | Dolfi | A61C 7/10 433/7 |
| 2017/0290643 A1* | 10/2017 | Giardino | A61C 7/10 |

FOREIGN PATENT DOCUMENTS

| | | |
|---|---|---|
| WO | 2015113173 | 8/2015 |
| WO | WO-2015113173 A1 * | 8/2015 |

* cited by examiner

ORTHODONTIC PALATAL AND JAW EXPANSION DEVICE THAT CAN BE EASILY ATTACHED TO/DETACHED FROM INSIDE THE MOUTH

CROSS-REFERENCE TO RELATED APPLICATIONS

This application is a § 371 national stage entry of International Application No. PCT/TR2016/000143, filed Oct. 20, 2016, which claims priority to Turkish Patent Application No. 201605406, filed Apr. 26, 2016, the entire contents of which are incorporated herein by reference.

The present invention relates to a device used in orthodontic treatment, also called the palatal and jaw expansion device, that can be easily attached to and detached from inside the mouth by the dentist.

Use of palatal expansion devices in orthodontic treatments to create space that provide proper alignment of crooked and badly positioned teeth in particular is known. In order to correct any crookedness and provide the space necessary for alignment of the teeth, the palatal expansion devices are placed in the palatal region between the bone structure and the molar teeth in the upper jaw palatal region and apply pressure on the teeth, providing movement of the upper jaw molar teeth toward the cheeks. Thus, the upper jaw expands and the arch perimeter where the teeth are aligned increases and space is provided for crooked teeth. The palatal expansion devices are divided into three main segments as tooth, soft tissue supported and/or bone-supported depending on the region from where support is taken.

The tooth and tissue supported palatal expansion devices fulfill their function by receiving support from the teeth and/or the hard and/or soft tissues in the palatal region in order to expand the narrow jaws and move the molar teeth toward the cheeks. Thereby, in case of crookedness and jaw narrowness, the teeth are enabled to be aligned without tooth extraction and space is provided. The bone tissue-supported palatal expansion devices, on the other hand, are fixed by means of miniscrews or implants on the surface of the upper jaw palate.

In one of the state of the art embodiments, the blocks on the screw move by rotating a pointed key in form of a needle around its own axis. In this type of palatal expansion devices, in order to be able to take out the device, the patient must fit the key accurately into the hole on the screw and rotate the same around its own axis and remove the key when the procedure is completed. However, this procedure is quite difficult for the patient to do, so it is carried out by another person, and since the hole on the screw cannot be accessed when the operation of rotating around the own axis cannot be properly carried out, the treatment process is disrupted, leading to greater problems.

Another problem occurs in the case that the key with a pointed tip like a needle did not fit accurately into the hole. In this case, the key may slip and puncture the palate, causing injury to the patient. Perhaps the most important problem is that the patient may drop the key into his/her mouth while turning the screw by means of the key and swallow the same.

A state of the art embodiment is disclosed in U.S. Pat. No. 7,780,445. A palatal expansion device that is opened and closed by means of an arm which is moved by being slid along the screw is disclosed.

The aim of the present invention is the realization of a palatal and jaw expansion device that can be easily attached to and detached from inside the mouth by the dentist providing a comfortable use.

The palatal and jaw expansion device realized in order to attain the aim of the present invention, explicated in the first claim and the respective claims thereof, comprises a movement mechanism that moves the screw with the blocks by means of an arm serving as a lever.

With the present invention, by means of the arm rotated around the horizontal axis where the screw extends, a palatal and jaw expansion device that is brought to open or closed position only by pushing or pulling the arm is proposed.

By means of the gearwheels forming the movement mechanism and moving in a unidirectional manner, the blocks are enabled to move on the screw in a more precise, accurate and robust manner and are stopped in the desired position. Since the gearwheels can move in one direction, the blocks are prevented from moving backward on the screw and are enabled to maintain their present position.

Screw threads bored in opposite directions are provided on both sides of the screw. Thus, the blocks placed on both sides of the screws are enabled to move toward each other or away from each other at the same time.

A stabilizing rod is disposed in parallel with the screw, allowing the blocks to move on the screw in a stabilized manner. The stabilizing rod guides the movement of the blocks on the screw.

The palatal and jaw expansion device can be attached to the teeth inside the mouth for retention. Moreover, the palatal and jaw expansion device can be fixed directly on the palate by means of miniscrews or implants on the palate. In both embodiments, the working principle of the palatal and jaw expansion device is the same and it is enough to change the parts on the tip of the retaining wires.

With the present invention, by means of the pushing or pulling force applied with a finger on the arm only, the palatal and jaw expansion device is enabled to be changed to the open or closed position.

By means of the present invention, in the orthodontic treatments, a comfortable use of the palatal and jaw expansion device is provided to both the physician and the patient, and the palatal and jaw expansion device can be attached and detached when necessary easily and soundly without loss of time. By means of the present invention, the palatal and jaw expansion device can be used quite practically by means of the arm. The patient can easily rotate the arm by himself/herself to change the palatal and jaw expansion device to the active or passive position. Since the movement mechanism is a unidirectional gear system, it can be wound like a jack and thus the arm goes loaded and returns empty. Moreover, by means of the present invention, the size can be provided quite small in comparison with other palatal and jaw expansion devices. Thus, the comfort of the patient is increased, allowing the patient to comfortably move his/her tongue.

A palatal and jaw expansion device realized in order to attain the aim of the present invention is illustrated in the attached figures, where:

FIG. 1—is the general view of a palatal and jaw expansion device.

Figure 2:
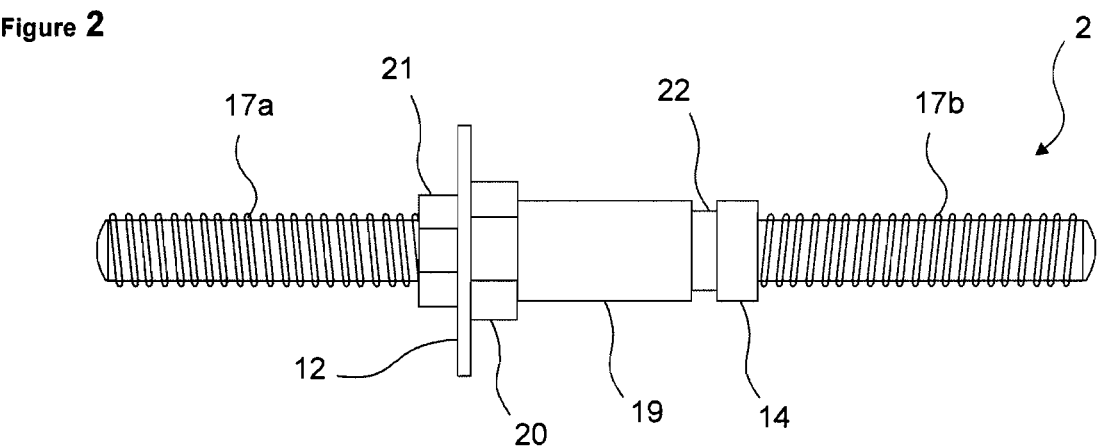

FIG. 2—is the general view of a screw.

Figure 3:
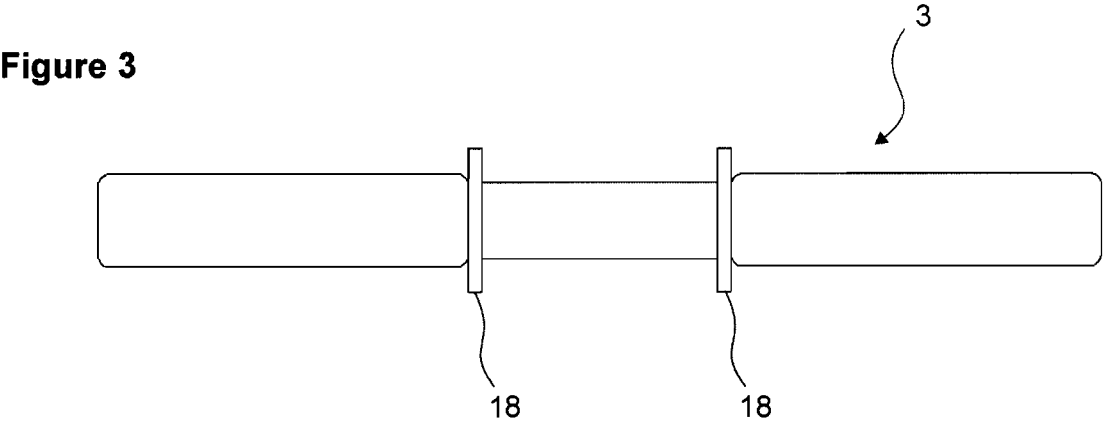

FIG. 3—is the general view of a stabilizing rod.

Figure 4:
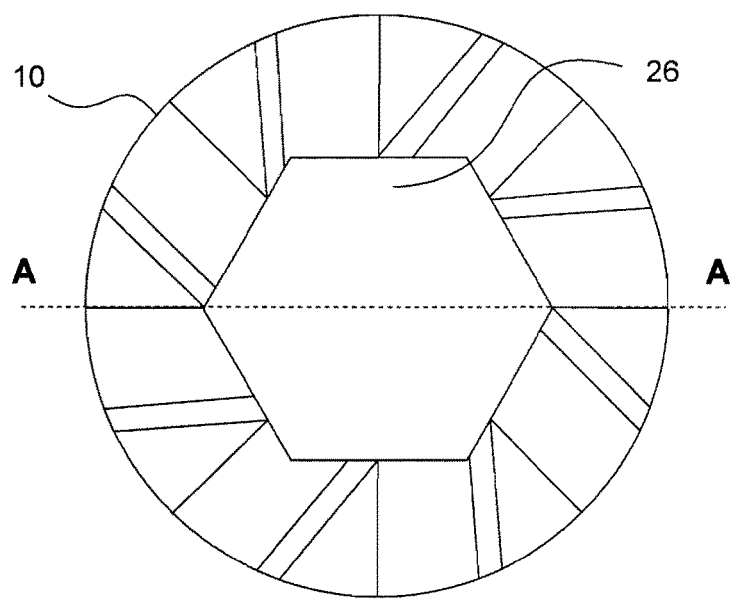

FIG. 4—is the top view of the second gearwheel.

Figure 5:
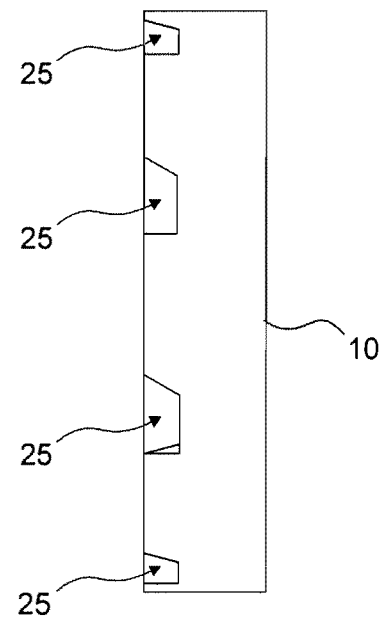

FIG. 5—is the sideways view of the second gearwheel.

Figure 6:
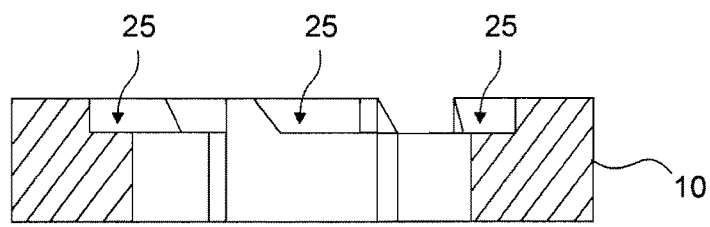

FIG. 6—is the view of the cross-section A-A in FIG. 3.

Figure 7:
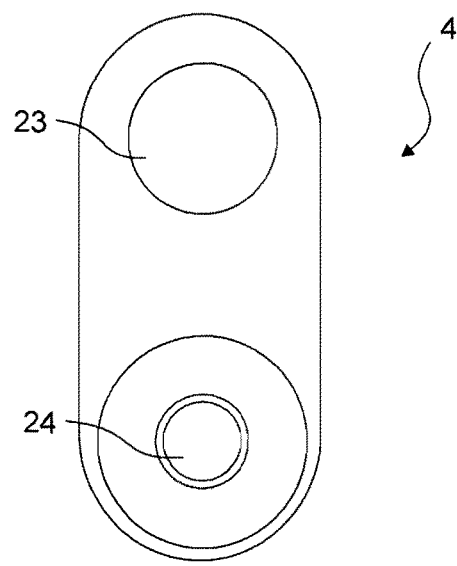

FIG. 7—is the general view of a block.

Figure 8:
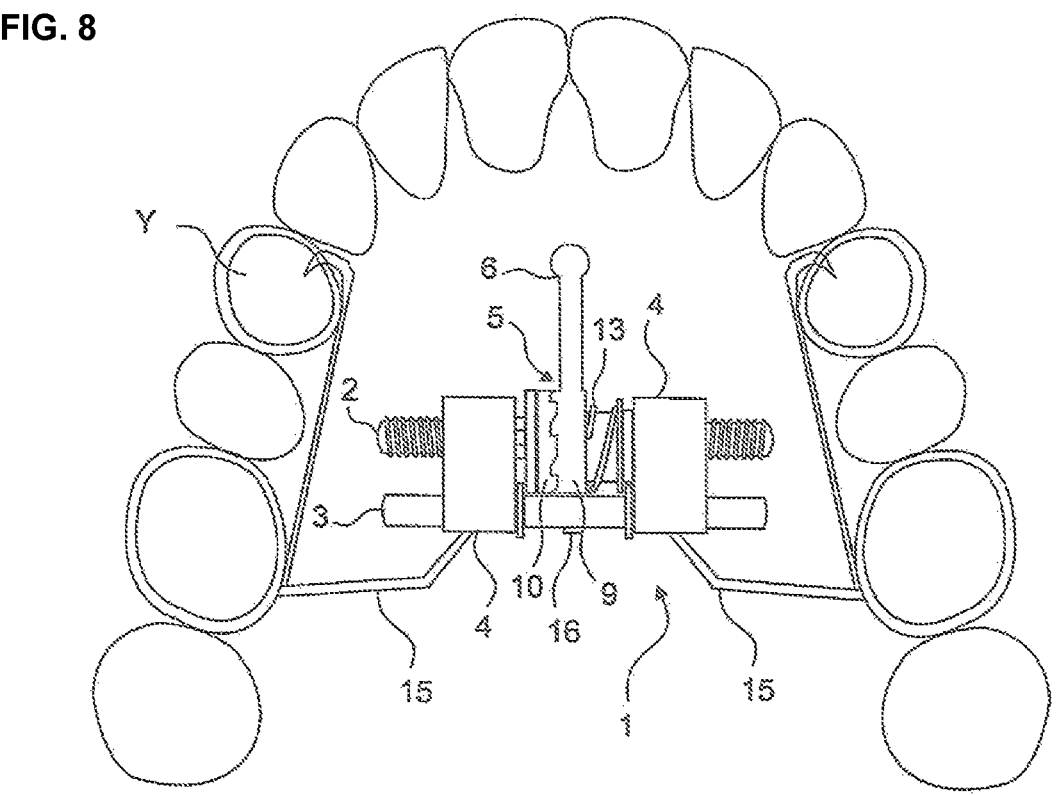

FIG. 8—is the view of the palatal and jaw expansion device attached to teeth in the passive position before the arm is turned.

Figure 9:
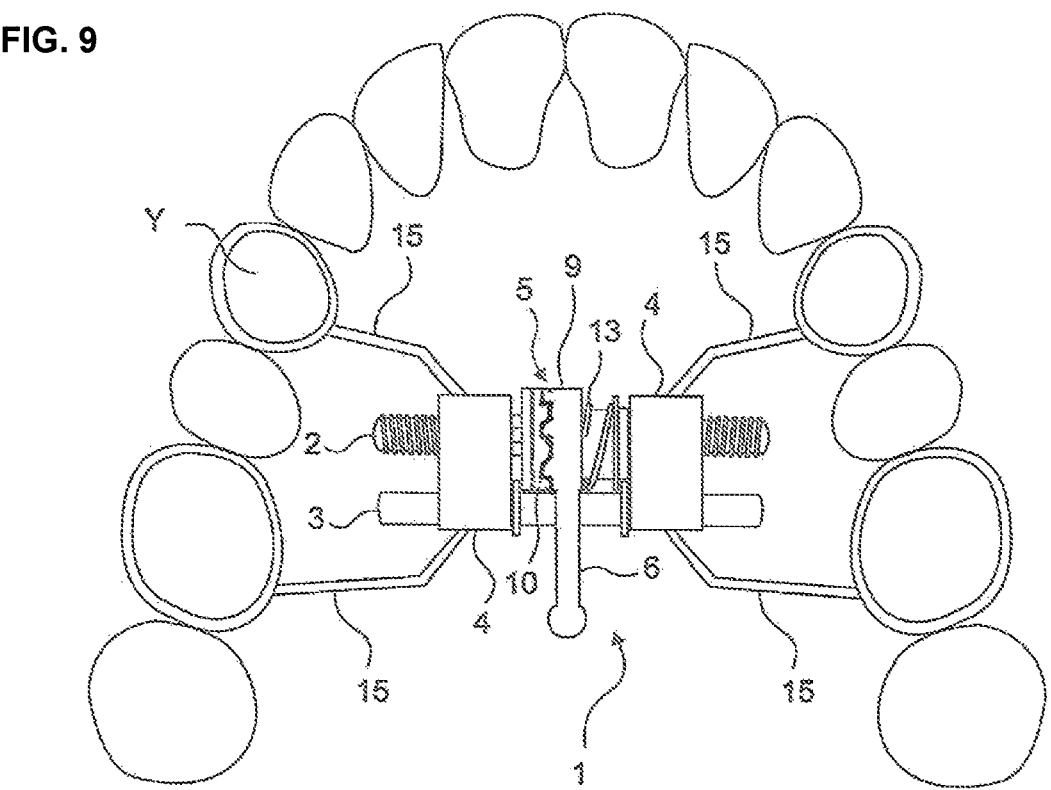

FIG. 9—is the view of the palatal and jaw expansion device attached to teeth in the active position after the arm was turned.

Figure 10:
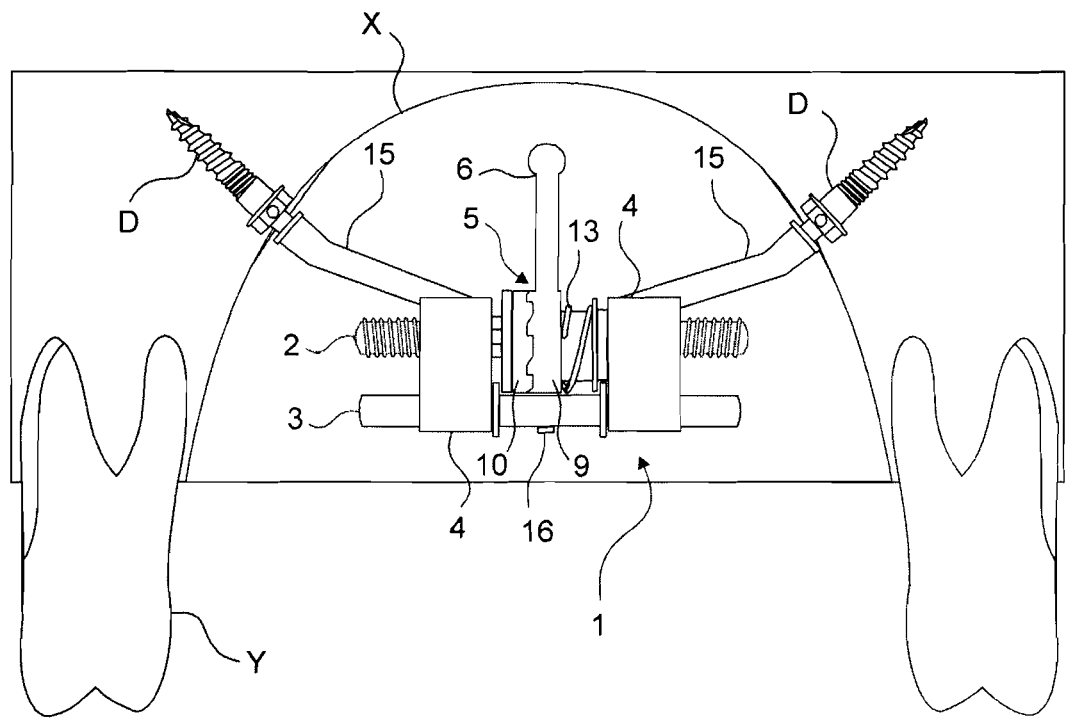

FIG. 10—is the schematic view of the palatal and jaw expansion device attached to palate.

Figure 11:
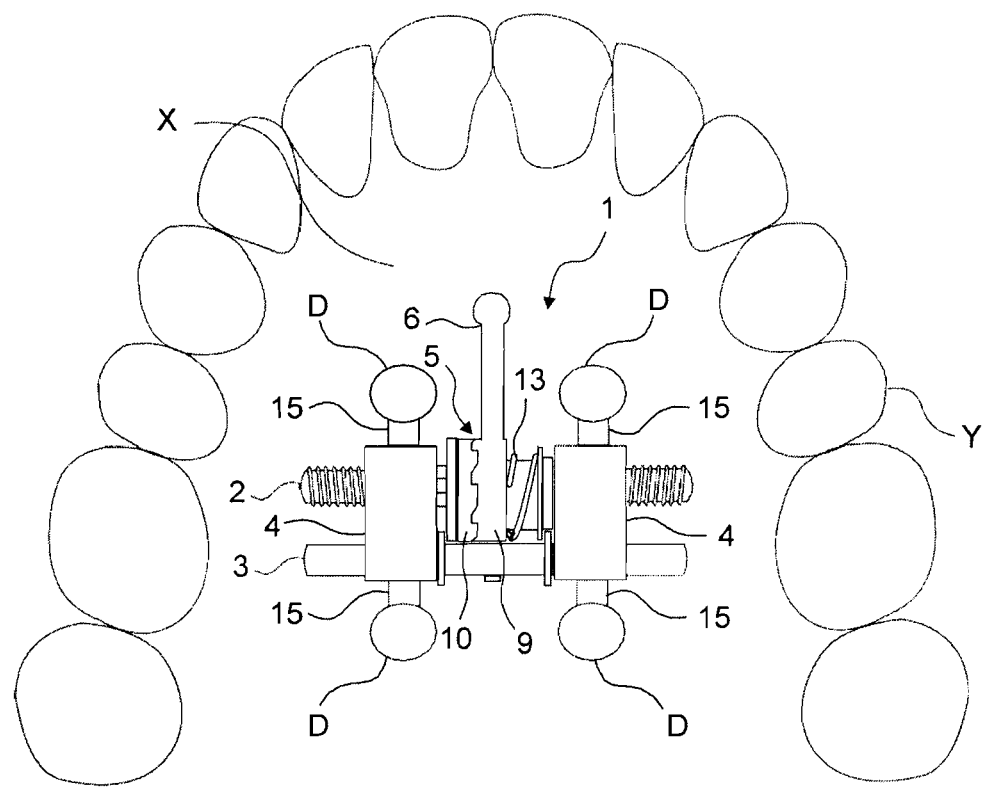

FIG. 11—is the schematic view of the palatal and jaw expansion device attached to the palate.

The elements illustrated in the figures are numbered as follows:
1. Palatal and jaw expansion device
2. Screw
3. Stabilizing rod
4. Block
5. Movement mechanism
6. Arm
7. Fixed end
8. Free end
9. First gearwheel
10. Second gearwheel
11. First set
12. Second set
13. Pushing member
14. Stopper
15. Retainer
16. Claw
17 *a*., 17 *b*. Screw threads
18. Protrusion
19. Bearing
20. Fixing element
21. Winding member
22. Auxiliary bearing
23. First hole
24. Second hole
25. Teeth
26. Housing The palatal and jaw expansion device (1) comprises at least one screw (2), at least two blocks (4) that are positioned on the screw (2) so as to move on the screw (2), at least one stabilization rod (3) whereon the blocks (4) are seated, a movement mechanism (5) disposed at the center of the screw (2) and an arm (6)

that has a fixed end (7) fixed to the movement mechanism (5) perpendicularly to the horizontal axis where the screw (2) extends and a free end (8), and that, when force is applied on the free end (8), rotates the movement mechanism (5) whereon the arm (6) is fixed and the screw (2) around the horizontal axis where the screw (2) extends, enabling the blocks (4) to move on the screw (2)

(FIG. 1).

The palatal and jaw expansion device (1) is placed inside the mouth by being attached to the palate (X) or the teeth (Y). The arm (6), when a force is applied thereon, functions as a lever and rotates the movement mechanism (5) whereto the fixed end (7) thereof is attached and the screw (2) whereon the movement mechanism (5) is positioned. The arm (6) is fixed perpendicularly to the horizontal axis where the screw (2) extends. The arm (6) is rotated not around its own axis but around the axis where the screw (2) extends. As a result of this rotating operation, the blocks (4) disposed on the screw (2) move on the screw (2) and reach the desired position. The arm (6) moves inside the mouth with an angle of approximately 135 degrees. The arm (6) makes a rotational movement of approximately 135 degrees between the closed position and the open position of the palatal and jaw expansion device (1) and in the closed position thereof inside the mouth the arm (6) stays almost parallel to the floor without disturbing the patient. As the arm (6) is shifted from the open position to the closed position by means of the patient's finger, the screw (2) does not wind backward and only the arm (6) and the first gearwheel (9) rotate idle. By means of the claw (16) on the first gearwheel (9), the arm (6) is enabled to be positioned in parallel with the floor and is prevented from moving further in an upward direction. The patient or the physician can change the palatal and jaw expansion device (1) to the open or closed position by pushing or pulling the arm (6) only with a single finger movement. By means of the present invention, the palatal and jaw expansion device (1) can be changed to the open or closed position comfortably without using any additional tool, without the need for inserting any other tool inside the mouth.

In an embodiment of the present invention, the palatal and jaw expansion device (1) comprises a first gearwheel (9) that is disposed on the movement mechanism (5), whereon teeth (25) in various profiles are bored, whereto the arm (6) is fixed and that rotates on the screw (2) around the horizontal axis by the movement of the arm (6), and a second gearwheel (10) that is fixed on the screw (2), that completely contacts the first gearwheel (9) so as to shift to the active position by the movement of the first gearwheel (9), and whereon teeth (25) in matching form with the teeth (25) on the first gearwheel (9) are bored.

In an embodiment of the present invention, the first and second gear wheels (9 and 10) comprise the teeth (25) that are preferably in the form of sawteeth (FIG. 4, FIG. 5 and FIG. 6).

In this embodiment of the present invention, when a force is applied externally on the free end (8) of the arm (6), the arm (6) rotates the first gearwheel (9) whereto the arm (6) is fixed and hence the second gearwheel (10) the teeth (25) of which completely engage with the teeth (25) of the first gearwheel (9) and which contacts the first gearwheel (9). As a result of the said rotational movement, the second gearwheel (10) fixed to the screw (2) rotates around the horizontal axis of the screw (2), thus enabling the blocks (4) thereon to move forward. The first and second gearwheels (9 and 10) operate in a unidirectional manner. Therefore, when the force applied on the arm (6) is removed and the arm (6) is moved backward to the original position, the first and second gearwheels (9 and 10) maintain their last positions.

The palatal and jaw expansion device (1) comprises screw threads (17*a*, 17*b*) bored on the screw (2) which is divided into two sections by the movement mechanism (5) in one direction on one side of the movement mechanism (5) and in reverse direction on the other side. The screw threads (17*a*, 17*b*) being bored in opposite directions provides that the blocks (4) placed on both sides of the screw (2) move so as to come closer to or move away from each other and hence that the palatal and jaw expansion device (1) is changed to the open or closed position. Thus, the blocks (4) on the screw (2) are enabled to move toward or away from the movement mechanism (5) at the same time. If one of the blocks (4) is moving toward the movement mechanism (5), the other also moves toward the movement mechanism (5). On the other hand, if one of the blocks (4) is moving away from the movement mechanism (5), the other also moves away.

The palatal and jaw expansion device (1) comprises a bearing (19) that is disposed on the screw (2) and wherein the movement mechanism (5) and the pushing member (13) are placed between the sections where the screw threads (17a, 17b) are disposed. The said bearing (19) enables the first and second gearwheels (9 and 10) to be positioned so as to rotate around the screw (2). In this embodiment of the present invention, the palatal and jaw expansion device (1) comprises a fixing member (20) that is disposed on the bearing (19), that is fixed to the screw (2), and wherein the second gearwheel (10) is placed. In this embodiment of the present invention, the fixing member (20) is a nut. At the center of the second toothed wheel (10), a housing (26) is provided in a form so that the housing (26) is engaged with the said fixing member (20). Thus, the second gearwheel (10) is prevented from rotating freely on the screw (2) as long as a force is not applied by the first gearwheel (9) (FIG. 2).

In an embodiment of the present invention, the block (4) comprises a first hole (23) wherein the stabilization rod (3) enters and a second hole (24) wherein the screw (2) enters. The centers of the first hole (23) and the second hole (24) are coaxial. Moreover, grooves in matching form with the screw threads (17a, 17b) are bored on the inner surface of the second hole (24) wherein the screw (2) enters. While the block (4) slides over the stabilization rod (3) which enters the first hole (23), the screw (2) entering the second hole (24) move in agreement with the threads (17a, 17b) thereon (FIG. 7).

In another embodiment of the present invention, the palatal and jaw expansion device (1) comprises an auxiliary bearing (22) that is disposed on the screw (2) adjacently to the bearing (19), and whereon a first set (11) is loosely placed. In the preferred embodiment, the diameter of the auxiliary bearing (22) is smaller than the diameter of the bearing (19). The auxiliary bearing (22) is limited by the stopper (14). Thus, the first set (11) is prevented from detaching from the auxiliary bearing (22). By means of this embodiment, the pushing member (13) between the first gearwheel (9) and the first set (11) is enabled to move more comfortably so that the first gearwheel (9) and the second gearwheel (10) move more comfortably.

In another embodiment of the present invention, the palatal and jaw expansion device (1) comprises a first set (11) and a second set (12) that are disposed on the screw (2) and that limit the first and second gearwheels (9 and 10) from both sides. The first and second gearwheels (9 and 10) are disposed between the first and second sets (11 and 12). Moreover, in this embodiment, the palatal and jaw expansion device (1) comprises at least one pushing member (13) between the first gearwheel (9) and the first set (11). While the second gearwheel (10) bears against the second set (12), the first gearwheel (9) bears against the pushing member (13) disposed between the first set (11) and the first gearwheel (9). In the preferred embodiment of the present invention, a spring is used as the pushing member (13). However, in this embodiment, the palatal and jaw expansion device (1) comprises a stopper (14) that is disposed on the movement mechanism (5) and that enables the second set (12) to remain in its place.

In this embodiment, while the first gearwheel (9) is rotated by means of the arm (6), the pushing member (13) enables the first and second gearwheels (9 and 10) to interlock and move together. The pushing member (13) pushes the first gearwheel (9) toward the second gearwheel (10) and enables the first gearwheel (9) and the second gearwheel (10) to contact each other at all times and the teeth (25) to interlock.

The palatal expansion device (1) comprises a claw (16) that is disposed on the movement mechanism (5), that prevents rotation of the arm (6) around the screw (2) freely, that enables the arm (6) to stay in the horizontal position inside the mouth, and that serves as a stopper.

The stabilization rod (3) is mounted to the blocks (4) in parallel with the screw (2). The stabilization rod (3) provides that the screw (2) is loosened comfortably against any unwanted pressures that may occur as the screw (2) is loosened and that the blocks (4) on the screw (2) move in a balanced and comfortable manner and that the screw (2) and the blocks (4) are kept together in a durable and rigid manner. The blocks (4) slide on the stabilization rod (3). The stabilization rod (3) serves as a guide for the blocks (4). The palatal and jaw expansion device (1) comprises two protrusions (18) that are disposed oppositely on the stabilization rod (3). The said protrusions (18) extend toward the movement mechanism (5) and the screw (2) and provide that the movement mechanism (5) stays on the screw (2) as a whole and prevent sliding of the stabilization rod (3) unilaterally, which is an unwanted event during the loosening process (FIG. 3).

In an embodiment of the present invention, the palatal and jaw expansion device (1) comprises a winding member (21) that is disposed on the screw (2) and that performs the task of winding the screw (2) backward when it is desired for any reason. In this embodiment of the present invention, the winding member (21) is a nut rotated around the screw (2).

The palatal and jaw expansion device (1) of the present invention can be attached to the teeth (Y) or to the surface of the palate (X). The palatal and jaw expansion device (1) comprises minimum two and preferably four retainers (15), each of which is fixed to a block (4), one end on the block (4) and the other end on the molar bands, the teeth (Y) or the surface of the palate (X) in a detachable manner (FIG. 8 and FIG. 9). In the preferred embodiment of the present invention, the retainers (15) are in the form of wire and are fixed on the block (4) preferably by means of a laser source, and in the embodiment where the retainers (15) are attached to the teeth (Y), rings are provided on the tips of the retainers (15) that are fitted onto the teeth (Y). In the version where the palatal and jaw expansion device (1) is fitted on the palate (X), miniscrews and implants (D) are provided on the tips of the retainers (15) and the palatal and jaw expansion device (1) is fixed on the surface of the palate (X) by means of the miniscrews and implants (D) (FIG. 10 and FIG. 11).

In the preferred embodiment of the present invention, the opening capacity of the palatal and jaw expansion device (1) is 12.5 mm. However, the opening capacity of the device (1) may vary depending on the needs of the physician and the patient and can be adjusted linearly or gradually—e.g. as 10 mm, 12 mm or 14 mm, etc.

The invention claimed is:

1. A palatal and jaw expansion device comprising at least one screw, at least two blocks that are positioned on the screw so as to move on the screw, at least one stabilization rod whereon the blocks are seated, comprising a movement mechanism disposed at a center of the screw and an arm that has a fixed end fixed to the movement mechanism perpendicularly to a horizontal axis where the screw extends and a free end, and that, when force is applied on the free end, the movement mechanism whereon the arm is fixed and the screw can be rotated around the horizontal axis where the screw extends, enabling the blocks to move on the screw, wherein a first gearwheel is disposed on the movement mechanism, whereon teeth in various profiles are bored, whereto the arm is fixed and that rotates on the screw around the horizontal axis by movement of the arm, and a second gearwheel that is fixed on the screw, that completely contacts the first gearwheel so as to shift to an active position by the movement of the first gearwheel, and whereon teeth in matching form with the teeth on the first gearwheel are bored, wherein a first set and a second set are disposed on the screw and that limit the movement of the first and second gearwheels from both sides, and wherein at least one pushing member is disposed between the first gearwheel and the first set.

2. A palatal and jaw expansion device as in claim 1, wherein the first and second gearwheels having sawtooth-shaped teeth.

3. A palatal and jaw expansion device as in claim 1, wherein the first and second gearwheels operate unidirectionally.

4. A palatal and jaw expansion device as in claim 1, wherein screw threads bored on the screw, which is divided into two sections by the movement mechanism, are in a direction on one side of the movement mechanism and in reverse direction on the other side.

5. A palatal and jaw expansion device as in claim 1, wherein a spring is used as the pushing member.

6. A palatal and jaw expansion device as in claim 1, wherein the second gearwheel bears against the second set and the first gearwheel bears against the pushing member that is disposed between the first set and the first gearwheel.

7. A palatal and jaw expansion device as in claim 1, wherein a stopper that is disposed on the movement mechanism and that enables the second set to stay in its place.

8. A palatal and jaw expansion device as in claim 1, wherein a claw that is disposed on the movement mechanism that prevents rotation of the arm around the screw freely, and enables the arm to stay in the horizontal position inside the mouth and serves as a stopper.

9. A palatal and jaw expansion device as in claim 1, wherein the stabilization rod is attached to the blocks in parallel with the screw.

10. A palatal and jaw expansion device as in claim 1, wherein two protrusions are disposed oppositely on the stabilization rod, and that extend toward the movement mechanism and the screw and provide that the movement mechanism stays on the screw as a whole and prevents sliding of the stabilization rod unilaterally.

11. A palatal and jaw expansion device as in claim 1, further comprising at least two retainers, each retainer has two ends, wherein one end of each retainer is fixed on a block and wherein the other end of each retainer is either fixed on a molar band or is adapted to be fixed to a tooth (Y) or on a surface of a palate (X) in a detachable manner.

12. A palatal and jaw expansion device as in claim 11, wherein the retainer is a wire-shaped retainer.

* * * * *